United States Patent
Csillag et al.

(10) Patent No.: US 11,106,946 B2
(45) Date of Patent: Aug. 31, 2021

(54) METHOD FOR ASSOCIATION OF ITEMS OF INTEREST VISIBLE IN A VIDEO

(71) Applicant: Idemia Identity & Security France, Courbevoie (FR)

(72) Inventors: Dora Csillag, Courbevoie (FR); Cécile Jourdas, Courbevoie (FR); Maxime Thiebaut, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 92 days.

(21) Appl. No.: 16/590,943

(22) Filed: Oct. 2, 2019

(65) Prior Publication Data
US 2020/0110971 A1    Apr. 9, 2020

(30) Foreign Application Priority Data
Oct. 3, 2018  (FR) ...................................... 1859158

(51) Int. Cl.
| | |
|---|---|
| G06K 9/62 | (2006.01) |
| G06K 9/00 | (2006.01) |
| G06N 3/04 | (2006.01) |

(52) U.S. Cl.
CPC ....... *G06K 9/6264* (2013.01); *G06K 9/00288* (2013.01); *G06K 9/00369* (2013.01);
(Continued)

(58) Field of Classification Search
CPC .......... G06K 9/00771; G06K 9/00711; G06K 9/4628; G06K 9/00335; G06K 9/00624; G06T 2207/10016
See application file for complete search history.

(56) References Cited

U.S. PATENT DOCUMENTS

| | | | |
|---|---|---|---|
| 2018/0046877 A1* | 2/2018 | Chen | ......................... G06T 7/11 |
| 2019/0130580 A1* | 5/2019 | Chen | .................. G06K 9/00711 |

OTHER PUBLICATIONS

International Search Report and Written Opinion of the French National Institute of Industrial Property (INPI) for FR1859158 dated Jun. 3, 2019.

(Continued)

*Primary Examiner* — Ross Varndell
(74) *Attorney, Agent, or Firm* — Womble Bond Dickinson (US) LLP

(57) ABSTRACT

The present invention relates to a method for association of items of interest visible in a video consisting of a sequence of K images, characterized in that it comprises the implementation by data processing means of a terminal of steps of: association of each item of interest from a first category visible in a $k^{th}$ image of said video with an item of interest from a second category, different from the first category, visible in said $k^{th}$ image; calculation of an association cost for a plurality of pairs of an item of interest from the first category visible in at least one image of the video with an item of interest from the second category visible in at least one image of the video, depending on at least the counters of association of pairs of one item of interest from the first category with one item of interest from the second category; use of a combinatorial optimization algorithm depending on the calculated association costs so as to reassociate each item of interest from the first category visible in said $k^{th}$ image with an item of interest from the second category visible in said $k^{th}$; updating of the association counters.

14 Claims, 8 Drawing Sheets

(52) U.S. Cl.
CPC ......... *G06K 9/00771* (2013.01); *G06K 9/628* (2013.01); *G06N 3/04* (2013.01)

(56) References Cited

OTHER PUBLICATIONS

Henschel, R., Leal-Taixe', L., Cremers, D., Rosenhahn, B., Fusion of Head and Full-Body Detectors for Multi-Object Tracking, 2018 IEEE/CVF Conference on Comupter Vision and Pattern Recognition Workshops (CVPRW), 2018, pp. 1509-1518, doi: 10.1109/cvprw.2018.00192.

King, J., Ai, H., Lao, S., 'Multi-Object Tracking through Occlusions by Local Tracklets Filtering and Global Tracklets Association with Detection Responses', 2009 IEEE Conference on Computer Vision and Pattern Recognition, 2009, pp. 1200-1207, doi: 10.1109/cvpr.2009.5206745.

Wang, S., Fowlkes, C.C., 'Learning Optimal Parameters for Multi-target Tracking with Contextual Interactions', International Journal of Computer Vision, 2016, 122(3), pp. 484-501, doi: 10.1007/s11263-016-0960-z.

\* cited by examiner

| Type | Filters | Size/Stride | Output |
|---|---|---|---|
| Convolutional | 32 | 3 × 3 | 224 × 224 |
| Maxpool | | 2 × 2/2 | 112 × 112 |
| Convolutional | 64 | 3 × 3 | 112 × 112 |
| Maxpool | | 2 × 2/2 | 56 × 56 |
| Convolutional | 128 | 3 × 3 | 56 × 56 |
| Convolutional | 64 | 1 × 1 | 56 × 56 |
| Convolutional | 128 | 3 × 3 | 56 × 56 |
| Maxpool | | 2 × 2/2 | 28 × 28 |
| Convolutional | 256 | 3 × 3 | 28 × 28 |
| Convolutional | 128 | 1 × 1 | 28 × 28 |
| Convolutional | 256 | 3 × 3 | 28 × 28 |
| Maxpool | | 2 × 2/2 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Maxpool | | 2 × 2/2 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 1000 | 1 × 1 | 7 × 7 |
| Avgpool | | Global | 1000 |
| Softmax | | | |

FIG. 5

METHOD FOR ASSOCIATION OF ITEMS OF INTEREST VISIBLE IN A VIDEO

CROSS-REFERENCE OF RELATED APPLICATIONS

This application claims the benefit of French Patent Application No. 1859158 filed Oct. 3, 2018, the disclosure of which is herein incorporated by reference in its entirety.

GENERAL TECHNICAL FIELD

The present invention relates to the domain of supervised training, and in particular a method for association of items of interest visible in a video, in particular by using a convolutional neural network.

STATE OF THE ART

Neural networks are massively used for data classification.

During an automatic training phase (generally supervised, meaning on an already classified reference database), a neural network "learns" and becomes capable on its own of applying the same classification to unknown data.

Convolutional neural networks (CNN) are a type of neural network wherein the connection pattern between neurons is inspired by the visual cortex of animals. They are thus particularly suited to a specific type of task, which is image analysis; indeed they allow efficient recognition of items of interest such as objects or people in images, in particular in security applications (e.g. automatic surveillance, threat detection, etc.). To do that, the CNN learns on the basis of training images, meaning images wherein the items of interest have already been "annotated", meaning shown and labeled with the corresponding item category.

More specifically a known use of CNN is to do what is called "tracking", meaning temporal monitoring of these items of interest such as people or objects.

More specifically, the objective is to analyze a sequence of successive images (typically frames from a video, for example acquired by a surveillance camera), and to identify a single item present between several images so as to be able to follow the movement thereof. Each identified item (for example each face) is assigned a unique identifier (typically an integer) shared with all frames. Thus, for example, a suspect can be recognized by their face and followed closely during their movement in a crowd.

Today, these techniques are satisfactory but can use improvement. In particular a problem "of association" between them is encountered for items when one is a subpart of the other. For example, it seems obvious that each person is associated uniquely and permanently with a face, or similarly that each vehicle is associated uniquely and permanently with a license plate, but this link is sometimes complex to maintain.

A first intuition is indeed to put aside the principle (in the example face/person) that a face detection must be included in the box of the person and therefore associating a face with a person detection who contains this face detection.

This solution is not reliable, because a pedestrian detection (the encompassing box) can "contain" several faces according to the context and arrangement of people. For example, referring to FIGS. 1a-1b (which show two successive frames from the same scene), an adult can hold a baby in their arms, and the box of the adult then contains two close face detections.

Thus, on the one hand the algorithm does not know which one to associate with the person detection, and on the other hand this association can be disrupted over time. In the example from FIG. 1a, the right face is correctly associated with the right person under the identifier 308, and the face of the baby has the identifier 311, but when the nose of this person enters into the box of the face of the baby (case in FIG. 1b), a change of the person-face association is seen: the face of the baby gets the identifier 308 of the adult whereas the face of the adult no longer has an associated person and is assigned the new identifier 316. Even though the association is reestablished some images later, it is with more identifiers created than real items (it is no longer known which association to trust), which distorts all the tracking.

Consequently, it would be desirable to have a new solution for association between an item and a subpart of this item which is simple, reliable and universal and without additional cost in computation time.

BRIEF DESCRIPTION OF THE INVENTION

According to a first aspect, the present invention relates to a method for association of items of interest visible in a video made up of a sequence of K images, characterized in that it comprises the implementation, by data processing means of a terminal, of steps of:
(a) Association of each item of interest from a first category visible in a $k^{th}$ image of said video with an item of interest from a second category, different from the first category, visible in said $k^{th}$ image;
(b) Calculation of an association cost for a plurality of pairs of an item of interest from the first category visible in at least one image from the video with an item of interest from the second category visible in at least one image of the video, depending on at least the counters of association of pairs of one item of interest from the first category with one item of interest from the second category;
(c) Use of a combinatorial optimization algorithm depending on the calculated association costs so as to reassociate each item of interest from the first category visible in said $k^{th}$ image with an item of interest from the second category visible in said $k^{th}$ image;
(d) Updating of the association counters.

According to other advantageous and nonlimiting characteristics:
the method is repeated iteratively for each image $k \in [[1; K]]$ in the video;
two associated items of interest are considered as being part of the same entity;
one from the first and from the second category of item of interest is a subpart of the other;
either one from the first and from the second category is the face category and the other is the person category, or else one from the first and from the second category is the license plate category and the other is the vehicle category or a subcategory of the vehicle category;
said combinatorial optimization algorithm is the Hungarian algorithm;
each item of interest is referenced with an identifier, two associated items of interest being referenced with the same identifier;
step (a) comprises the detection of at least one item of interest from a first category visible in said image and of at least one item of interest from a second category different from the first category visible in said image, by means of at least one convolutional neural network, CNN; and the association of each item of interest from the first category detected with an item of interest from the second category detected;

the method comprises prior use of a parameter training method of said CNN by data processing means of at least one server, for detection of items of interest visible in images, based on at least one training image database wherein said items of interest and also characteristic geometric structures are already annotated, where the CNN comprises an encoding layer for the generation of a representation vector for detected items of interest, where said representation vector comprises, for at least the first category of item of interest, at least one descriptive value of the at least one characteristic geometric structure of said first category of item of interest;

said representation vector comprises two position values and one visibility value for the at least one characteristic geometric structure of said given category of item of interest;

said characteristic geometric structure is a characteristic point;

said representation vector comprises values descriptive of at least three characteristic geometric structures of said first category of item of interest;

the second category is a subpart of the first category, where the characteristic geometric structures of the first category of item of interest are also characteristic geometric structures of the second category of item of interest;

the method further comprises the detection, for each item of interest from the first detected category, of one or more characteristic geometric structures of said first category of item of interest that are visible in said image;

the method comprises the calculation, for each pair of a first item of interest from the first detected category and a second item of interest from the second detected category, of a covering score between a box of said second item and the one or more characteristic geometric structures of said first category of interest for the first item;

The association is done using a combinatorial optimization algorithm depending on the calculated covering scores;

the method comprises the prior implementation of a parameter training method for a convolutional neural network, CNN, by the data processing means of at least one server, for detection of items of interest visible in the images, where the method is characterized in that it is executed from a plurality of training image databases wherein said items of interest are already annotated, with the CNN being a CNN shared by said plurality of training image databases, and having a shared core and a plurality of encoding layers each specific to one of said plurality of training image databases;

each encoding layer is a convolutional layer, in particular with 1×1 size filters or a fully connected layer, generating a representation vector of the detected items of interest;

each training image database is associated with a set of categories of item of interest, where the items of interest detected in the images from a database are those belonging to a category of said set associated with the database, and where said sets of categories are different from one database to another;

said plurality of training image databases comprises at least one first database, one second database and one third database, where the set of categories of item of interest associated with the first database comprise the face category, the set of categories of items of interest associated with the second database comprise the person category, and the set of categories of item of interest associated with the second database comprise the vehicle category or at least one subcategory of the vehicle category;

An association cost is calculated in the step (b) for each pair of an item of interest from the first category detected in the $k^{th}$ image with an item of interest from the second category already detected in at least one image from the video such that the association counter for said pair is not zero, and for each pair of an item of interest from the second category detected in the $k^{th}$ image with an item of interest from the first category already detected in at least one image of the video such that the association counter for said pair is not zero;

if the step (a) comprises the detection in the $k^{th}$ image of at least one first item of interest, one second item of interest and a third item of interest, where the first item of interest is from the first category and the second and third items of interest are from the second category, and if the first item of interest is associated with the second item of interest, depending on the result, the step (c) comprises using said combinatorial optimization algorithm:

Either keeping the association of the first item of interest with the second item, the association counter of the first item of interest with the second item of interest then being incremented in step (d);

Or the reassociation of the first item of interest with the third item of interest in place of the second item of interest, the association counter of the first item of interest with the third item of interest then being incremented in step (d);

if the step (a) comprises the identification in the $k^{th}$ image of at least one first item of interest and one second item of interest but not that of a third item of interest, where the first item of interest is from the first category and the third item of interest is from the second category, and if the first item of interest is associated with the second item of interest, depending on the result, the step (c) comprises using said combinatorial optimization algorithm:

Either keeping the association of the first item of interest with the second item, the association counter of the first item of interest with the second item of interest then being incremented in step (d);

Or the reassignment of the identifier of the third item of interest to the second item of interest, the association counter of the first item of interest with the third item of interest then being incremented in the step (d);

an association counter not incremented is decremented in step (d);

The cost of association of the $i^{th}$ item of interest from the first category visible in said $k^{th}$ image with the $j^{th}$ item of interest from the second category visible in said $k^{th}$ image is obtained in step (b) by one of the following formulas:

$$C_{ij} = 1 - \frac{2*ac_{ij}}{\sum_{l=0}^{n} ac_{il} + \sum_{l=0}^{m} ac_{lj}} C_{ij} = \sum_{l \neq j}^{n} ac_{il} + \sum_{l \neq i}^{m} ac_{lj},$$

$$C_{ij} = 1 - \frac{2*ac_{ij}*sd_i*sd_j}{\sum_{l=0}^{n} sd_i ac_{il} + \sum_{l=0}^{m} sd_j ac_{lj}} \text{ or}$$

$$C_{ij} = \sum_{l \neq j}^{n} sd_i ac_{il} + \sum_{l \neq i}^{m} sd_j ac_{lj};$$

the first category and m is the number of items of interest from the second category visible in said $k^{th}$ image and $sd_{i/j}$ are respectively the detection scores of said $i^{th}$ item of interest from the first category and said $j^{th}$ item of interest from the second category.

According to a second and third aspects, the invention proposes a computer program product comprising code instructions for the execution of a method according to the first aspect of association of items of interest visible in a video; and a storage means readable by computer equipment on which a computer program product comprises code instructions for executing a method according to the first aspect of association of items of interest visible in a video.

DESCRIPTION OF THE FIGURES

Other characteristics and advantages of the present invention will appear upon reading the following description of a preferred embodiment. This description will be given with reference to the attached drawings wherein:

FIG. 5 shows an example of CNN architecture for implementation of a detection task for an embodiment of the method according to the invention;

DETAILED DESCRIPTION

Concepts

Figure 3:
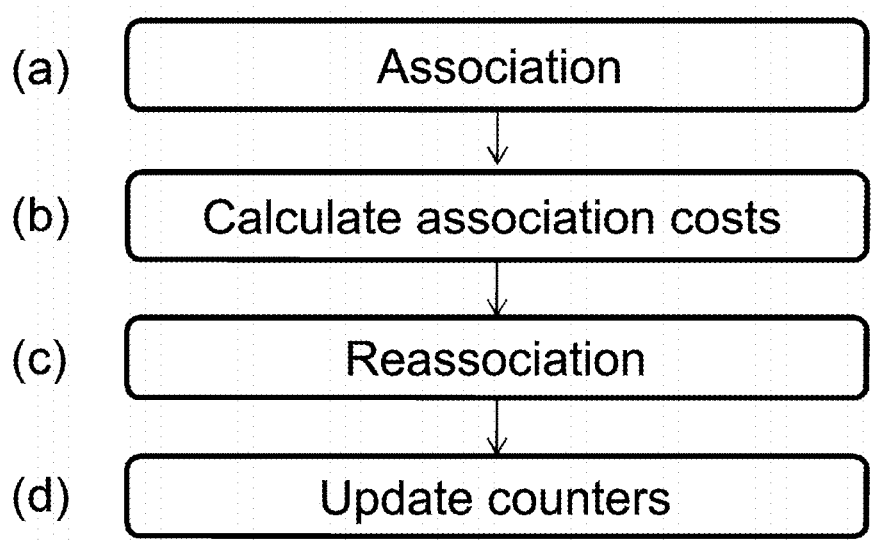
FIG. 3 shows the steps of a preferred embodiment of a method according to the invention.

Referring to FIG. 3 which will be described later, according to several complementary aspects the present invention may involve:

a training method for a convolutional neural network (CNN);

a method for detection of items of interest visible in an image;

a method for association of items of interest visible in an image/in a video consisting of a sequence of K images (i.e. of frames);

a method for tracking items of interest visible in the video.

Here, the term "item of interest" designates any representation in the image/video of an entity for which the detection/association/tracking in an image/video is desired. Each item of interest is from one given category, corresponding to a type in a semantic meaning. For example, the person, face, vehicle, license plate, etc. categories can be considered: the vehicle category covers together all vehicles (car, truck, bus, etc.) whatever the model, color, etc. and the license plate category covers the set of all plates whatever the issuing country/region, color, etc.

"Detection" or "recognition" is the most basic operation, and designates the simple marking of an item of interest from a known category in an image. Detection thus combines localization (determination of the position and size of the box enclosing the item of interest, called detection box) and classification (determination of the category thereof).

"Following" is understood to mean as previously explained the "tracking" of these items of interest during the length of the video, meaning the continuous identification of a single item detected from image to image where it is present so as to determine the movement of the corresponding entity over time.

To do that, each item of interest is referenced with an identifier; the set of occurrences of one item of interest for a given identifier is called a "track".

The distinction will be made between "detection" and "identification": whereas detection is done image by image, and does not make a distinction between the various items from the same category, identification assigns the proper identifiers to the detections such that two detections of the same entity over two different images have the same identifier, i.e. be part of the same track. For example, assuming that on a first image two items from the person category are identified as "person 1" and "person 2" and again on a second image two items from the person category are detected, the identification serves to determine in the second image which is the person ½ (or even a person 3).

The identification can in other words be seen as aligning one detected item with one entity, meaning the distinction between the various items of the same category that are detectable on one or more images.

It is understood that in "perfect" tracking one entity should be identified uniquely and consistently with a single item of interest, i.e. it should have an exact correspondence between item of interest and entity, but in practice over time one entity can be associated with several items of interest (constituting duplicates), or even one item of interest can change entity (confusion of two entities), see below. It is a matter of inaccuracies in the tracking that the present method serves to resolve effectively.

"Association" is understood to mean aligning two items of interest from different but related categories.

Figure 1A:
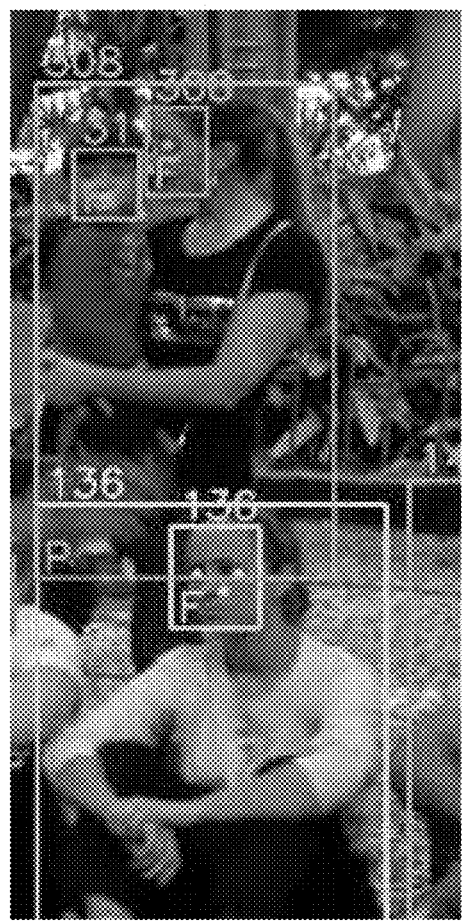
FIGS. 1a and 1b represent two examples of association of items of interest in video images by using a known method.
Figure 1B:
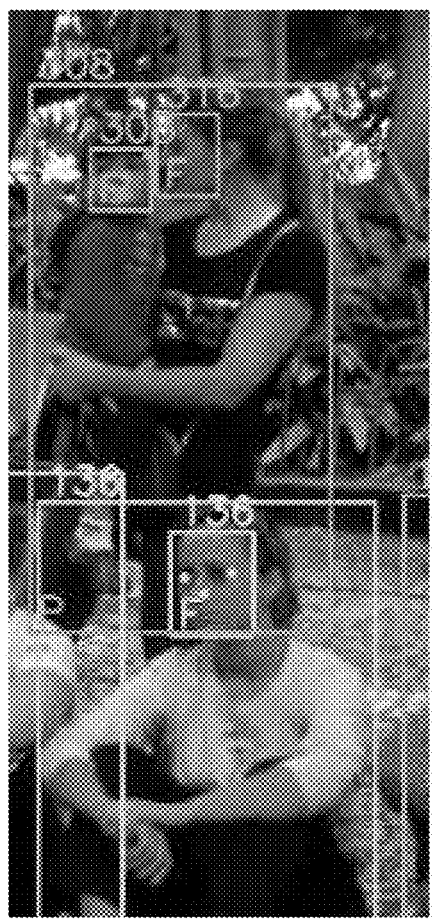

A first item of interest from a first category and a second item of interest from a second category can be associated if they have a connection, in particular if they are part of the same entity. In general two associated items of interest from different categories are referenced by a single identifier, i.e. there is one identifier per entity, as is the case in the examples from FIGS. 1a, 1b.

The difference is made between the simple association of items of interest in a given image i.e. this image taken in isolation and independently of any context and the association of items of interest in a video, which will more specifically be the subject of the invention, wherein the association of item of interest in one image considers associations in past images, in other words a consistency in the video is targeted.

In the remainder of the description, the preferred embodiment of a "subpart" type association will be considered. In other words, one from the first and from the second category of item of interest is a subpart of the other, i.e. is a part thereof. Arbitrarily, the present description considers the second category as being a subpart of the first category, but naturally the converse could be considered. According to an example, the second category is the face category and the first category is the person category. According to another example, the second category is the license plate category and the first category is the vehicle category.

It should be noted that the invention will not be limited to a subpart type association, and for example one could consider an association of categories that are themselves subparts of a third category (for example a face-hand association).

One may even consider cases of association where there is no part/subpart relationship whether directly or indirectly, for example person and baggage.

In a case where there are more than two categories of items of interest which can be associated (for example, person/face/hand), in particular a first category, a second category and a third category, it is sufficient to define a main category ("part") and secondary categories ("subparts"), and each secondary category will be associated with the main category. For example, if there is a person/face/hand, each hand will be associated with a person and each face will be associated with a person, but there will not be an attempt to associate the hands and the faces (to the extent where this association is known by transitivity from the two others).

In the scope of the present invention, the aim more precisely is the simultaneous tracking of at least two categories of items of interest, in particular so as to associate them for the duration.

Again, it will be understood that in a "perfect" tracking two items of interest from different categories should be associated if and only if they are part of the same entity, but in practice and in particular in case of error in the identification, some items of interest can be associated whereas in reality they correspond respectively to two different entities, or instead some items of interest although corresponding to the same entity might not be associated. The present method also aims to resolve these problems.

Figure 4A:
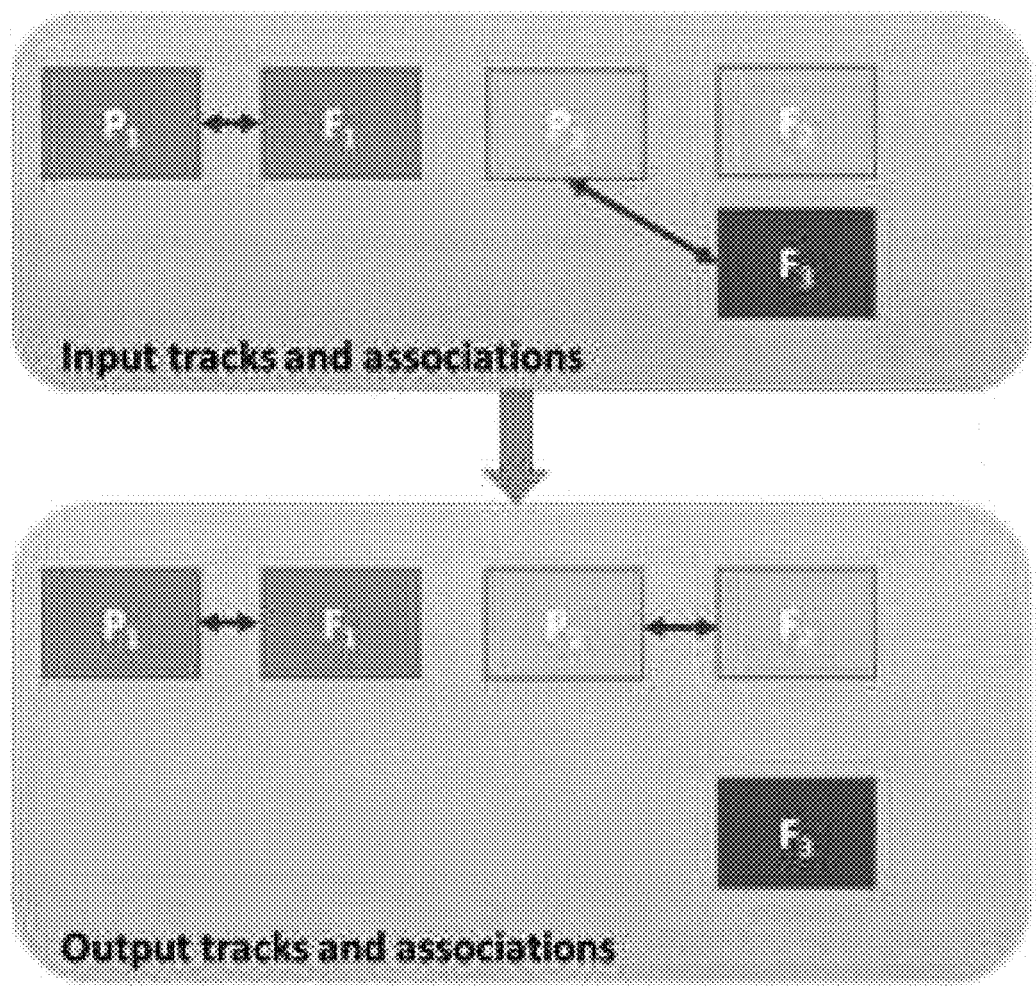
FIGS. 4a-4b represent two erroneous cases of association/identification of items of interest and how the method according to the invention resolves these cases.
Figure 4B:
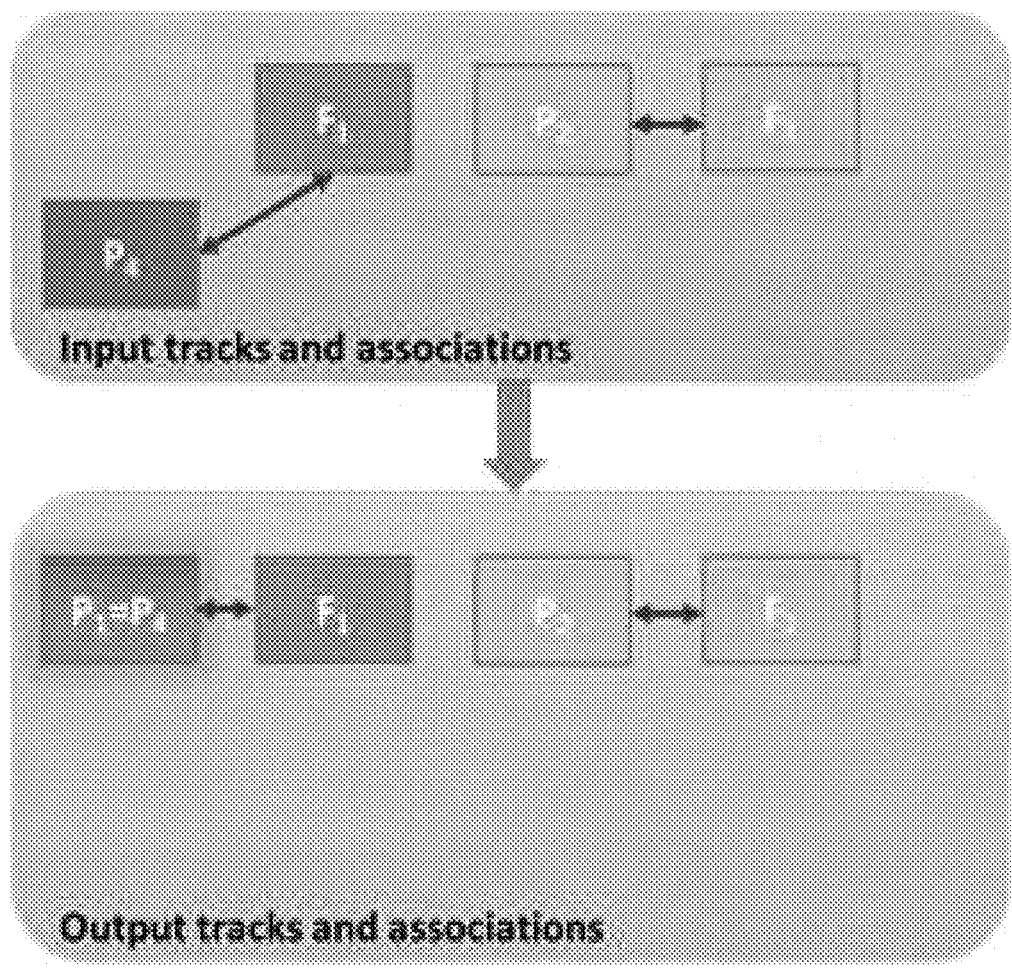

FIGS. 4a and 4b represent two examples of inaccurate associations and how they are "corrected" thanks to of the implementation of the present association method, which will be described later.

In the figures, the items of interest referenced $P_j$ ($P_1$, $P_2$ and $P_4$) are from the person category ("first" category), and the items of interest referenced $F_j$ ($F_1$, $F_2$ and $F_3$) are from the face category ("second" category). It is assumed that $P_1$ and $P_4$ are items of interest forming duplicates (they identify the same first person), and $P_2$ validly identifies a second person. It is also assumed that $F_1$, $F_2$ and $F_3$ validly identify the respective faces of the first, the second and a third person.

In FIG. 4a, there is on the one hand an accurate association of $P_1$ with $F_1$ (the first person and their face), and on the other hand an inaccurate association of $P_2$ with $F_3$ instead of with $F_2$ (the face of the third person is associated with the second person). There is no problem in the tracks but the association needs to be improved.

In FIG. 4b, this time there is on the one hand an accurate association of $P_2$ with $F_2$ (the second person and their face), and on the other hand an association of $P_4$ with $F_1$. This latter association is not completely inaccurate because $P_4$ identifies the first person, however the first person needs to be identified by the "original" track $P_1$ and not by the duplicate $P_4$.

Figure 2:
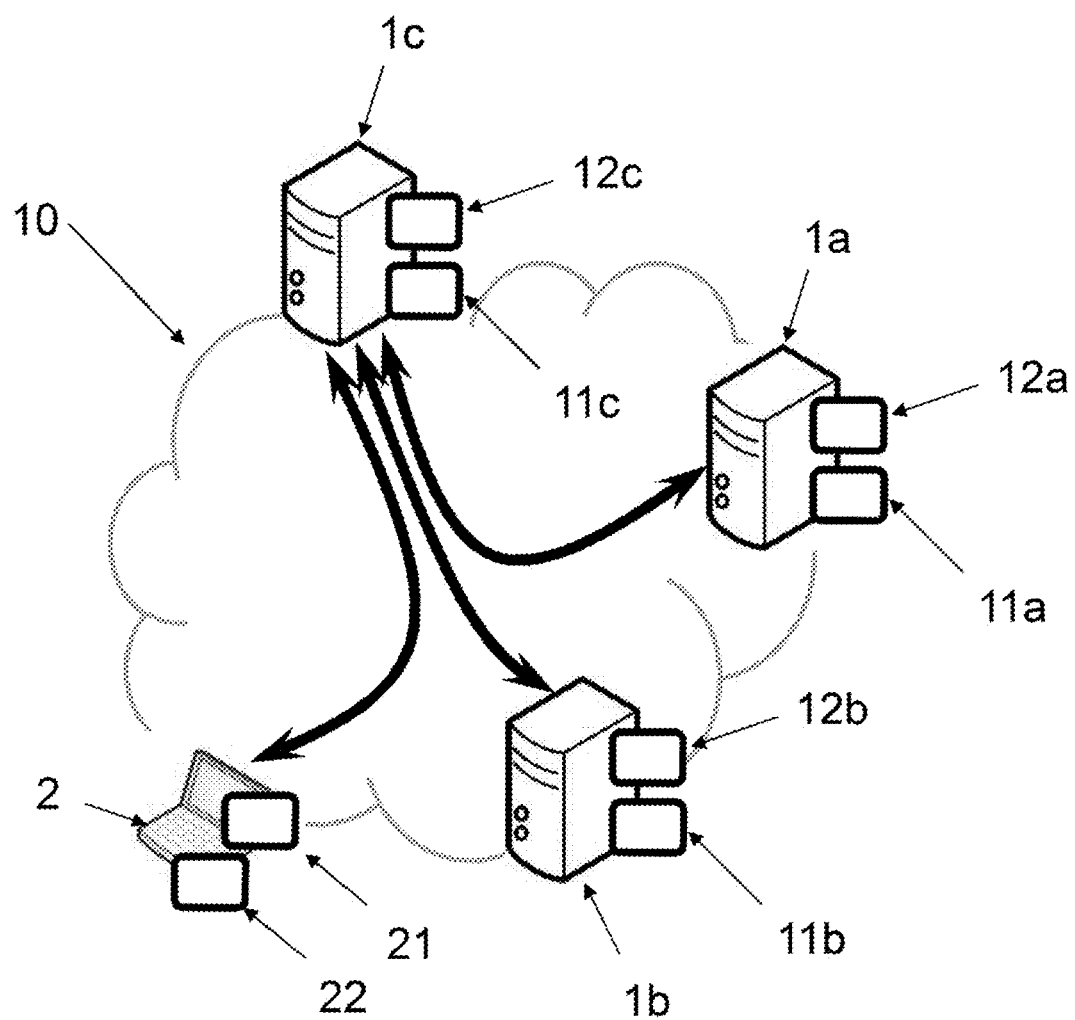
FIG. 2 is a diagram of an architecture for implementation of the methods according to the invention.

The present methods are implemented within an architecture such as shown by FIG. 2, by means of one or more servers 1a, 1b, 1c and a terminal 2. As will be seen, the method may comprise training of one or more convolutional neural networks, CNN, and as necessary the one or more servers 1a, 1b and 1c are associated learning equipment. For its part, terminal 2 is user equipment strictly speaking, meaning implementing all or part of the present method, for example video surveillance data processing equipment.

In any case, each device 1a, 1b, 1c, 2 is typically remote computer equipment connected to a wide-area network 10 such as the Internet for the exchange of data. Each comprises processor type data processing means 11a, 11b, 11c, 21 and data storage means 12a, 12b, 12c, 22 such as computer memory, for example a drive.

At least one of the potential servers 1a, 1b, 1c stores a training database, i.e. a set of training images, meaning on which items of interest have already been annotated and labeled with the corresponding item category (in contrast to the video referred to as input on which tracking is to be done). Preferably, at least two, even at least three, training image databases are stored on as many distinct servers (for example 2 servers 1a and 1b in FIG. 2).

In FIG. 2, the server 1c is an optional server which for its part does not have a training image database and which implements getting the one or more CNNs from the databases of the servers 1a, 1b. The role of this server 1c can however be fully accomplished by one or the other of the servers 1a, 1b.

CNN

A CNN generally comprises four types of layers successively processing information:

the convolution layer which processes blocks from the input one after the other;

the nonlinear layer with which to add nonlinearity to the network and therefore to have much more complex decision functions;

the pooling layer with which to combine several neurons into a single neuron;

The fully connected layer which connects all the neurons from one layer to all the neurons of the preceding layer.

The nonlinear layer activation function NL is typically the function ReLU (Rectified Linear Unit) which is equal to f(x)=max(0, x) and the pooling layer (labeled POOL), the most used, is the function Max Pool2×2 which corresponds to a maximum among four values of a square (four values are pooled into only one).

The convolution layer, labeled CONV, and the fully connected layer, labeled FC, generally correspond to a scalar product between the neurons of the preceding layer and the weights from the CNN.

Typical CNN architectures stack several pairs of CONV→NL layers and then add a POOL layer and repeat this plan [(CONV→NL)$^p$→POOL] until getting a sufficiently small size output factor, and then ending by one or two fully connected FC layers.

In image analysis, there aren't always nonlinear layers NL or even fully connected layers FC.

The person skilled in the art may for example refer to the CNN described in the documents YOLO9000: Better, Faster, Stronger—Joseph Redmon, Ali Farhadi, https://arxiv.orq/abs/1612.08242, Faster R-CNN: Towards Real-Time Object Detection with Region Proposal Networks, https://arxiv.orq/abs/1506.01497, or their derivatives.

In the remainder of the present description, an example of CNN will be used in particular based on the "Darknet-19" architecture shown in FIG. 5 and described in the document YOLO9000, which comprises 19 convolution layers CONV, five pooling layers Max Pool2×2 (Alternatively, one may also cite the "Darknet-53" version with 53 convolution layers CONV, or any other VGG, RESNET, DENSNET, etc. type architecture).

Taking the example of Darknet-19, a detection CNN can be built by taking the shared core thereof (i.e. the part extending up to the double horizontal line in FIG. 5) and potentially adding three layers of convolution to it having 1024 filters that are 3×3 in size and especially a last convolution layer CONV advantageously having 1×1 filters, which acts as a layer called "encoding" and has an output of size C (i.e. has a number of filters equal to the desired size of the output representation vector, see below). Alternatively, a fully connected layer FC can be used as encoding layer.

Indeed, the objective of a CNN based method is to describe as precisely and repeatedly as possible the content of the image in the form of a vector containing all the information about items to be detected; that is what the encoding layer provides. Thus, the encoding layer generates a representation vector for the detected items of interest.

The image is cut spatially into S cells (for example, 7×7 cells), where each cell has B "description boxes" (typically B=2 or 3), which indicate the presence of one or more items of interest (up to B items) in that cell, and they thus constitute "candidate" detection boxes. A good detection box is one which best encompasses (meaning most closely) the corresponding item of interest.

The presence of an entity in the description box results in at least the data for the position thereof in the cell and the category thereof, coded in the form of the vector called "representation" of C values generated by the encoding layer. Generally, the vector comprises at least five values:

x/y coordinates of the center of the description box (as a fraction of the size of the cell);

w/h width/height coordinates of the description box (as a fraction of the size of the cell);

Identifier c of the category of the item of interest.

The total description code for an image is the concatenation of all the representation vectors of the description boxes, having a length of S*B*C.

Figure 7A:
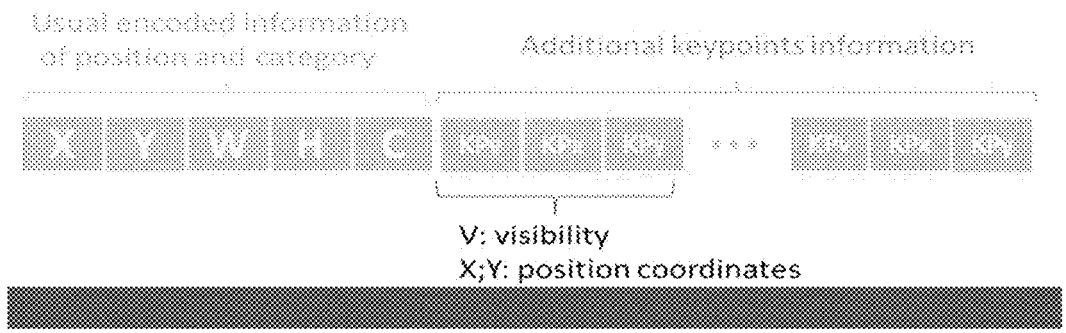
FIG. 7a shows a sample representation vector generated during implementation of a preferred embodiment of the method according to the invention.
Figure 7B:
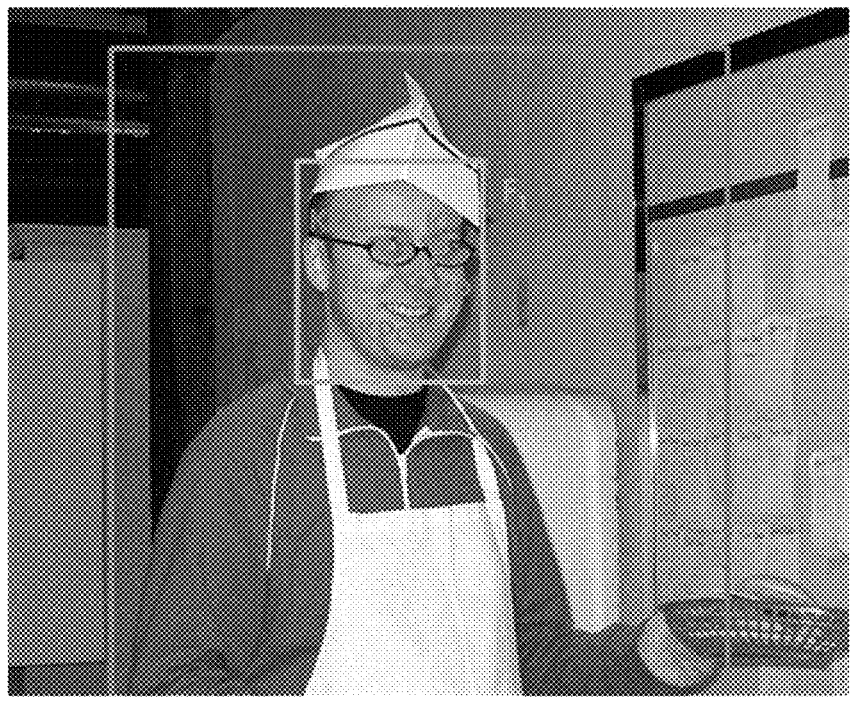
FIG. 7b shows a sample of association of items of interest in an image according to a preferred embodiment of the method according to the invention.

With reference to FIG. 7a, at least some representation vectors (those for an item of interest from a given category, for example people) are lengthened, i.e. have descriptive values from at least one characteristic geometric structure of said category concatenated to it; in particular said descriptive values advantageously comprise at least two position values (coordinates KPx/KPy) and/or a visibility value (Boolean value KPv). In a particularly preferred way, there are at least three characteristic geometric structures, meaning at least nine additional descriptive values, as will be seen later.

Thus, the detection of characteristic points is done simultaneously with the detection of items of interest, without extra time cost and without worsening of performance.

"Characteristic geometric structure" is understood to mean very specifically a characteristic point ("key point"), but also a shape such as a polygon, mesh, etc. and generally any easily referenceable graphical object from all the items of this category. In a particularly preferred way, when one of the first category and of the second category is a subpart of the other, characteristic geometric structures shared by the first category and the second category are chosen. In the face/person example, one can thus for example take the two eyes and the nose: indeed, it involves geometric structures of a very specific form, characteristics both of a person and a face.

By using these "shared" characteristic geometric structures, the association of items from two categories in the image can be done very cleverly and very reliably, as will be seen later.

In the remainder of the description, the example will be used wherein said geometric structures are points, and for example the eyes and nose of a face will be annotated as points.

Advantageously, other information can be encoded in this code on the representation vector (other encompassing boxes, information on the action in progress, a license plate number from a vehicle, etc.).

Training Method

Advantageously, a training method is implemented for parameters from at least one convolutional neural network, CNN, for detecting visible items in images, from a plurality of training image databases wherein said are already annotated, i.e. located and classified (the category is determined). Each image database is indeed advantageously associated with a set of categories of item of interest, where the items of interest annotated in the images from a database are those belonging to a category of said set of categories associated with the database.

As explained before, for the items from at least one given category one or several characteristic geometric structures can already be annotated, i.e. the coordinates thereof in the image are known. It is understood that the characteristic geometric structures are not always visible and therefore are only indicated when they are visible. For example, a person in profile might be detected as an item of person category (also their face), but their left or right eye will not be visible because it is on the other side of the head.

According to a first conventional mode, each CNN is trained from a single training database, for a subset of the set of categories associated with this database (even a single category, and in particular the first or the second category). In other words, it learns to recognize one or more categories of items already annotated in the training images from this database.

It is not possible to merge two training databases because they are "partially" annotated one relative to the other. For example, if a database of people and a database of vehicles are considered, the vehicles are not annotated in the database of people and vice versa, which forms false negatives which would completely disrupt the training. It would be necessary to manually add the missing annotations, which is an enormous amount of work. As an example consider the MS-COCO database (the most used) which contains only annotations for people, some animals and a few objects, but no annotations for faces. The WIDER database will also be indicated here which contains only face annotations.

Additionally, if one of the first and the second category of item of interest is a subpart of the other, it would not be possible, even by creating an ad hoc database, to simultaneously train a CNN to detect both categories because of their inclusion.

Thus, in the case where the first category is in the set of categories from a first database and the second category is in the set of categories from a second database, two CNNs are trained which constitute two independent "detectors".

For example, on the one hand a detector for face category items can be trained from a first database associated with a set of categories of item of interest comprising the face category (typically directly by processing means 11a of the first server 1a if it is the one storing the first database) and on the other hand a detector of person category items can be trained from a second database associated with a set of categories of item of interest comprising the person category (typically directly by the processing means 11b of the second server 1b if it is the one storing the second database).

It should be noted that limiting the number of different categories detectable by a CNN makes a corresponding reduction in the size necessary for the output representation vector.

According to a second preferred embodiment, the problem of the incompatibility of the various databases is cleverly avoided so as to have at least one common CNN trained directly from a plurality of training image databases and, with only one training. This is advantageously done by data processing means 11c from server 1c connected to the other database servers 1a, 1b. Said CNN is called "common" to several databases (in other words it is a single CNN which learns at the same time from several databases), in contrast to conventional CNNs which can each only learn from one database.

Figure 6:
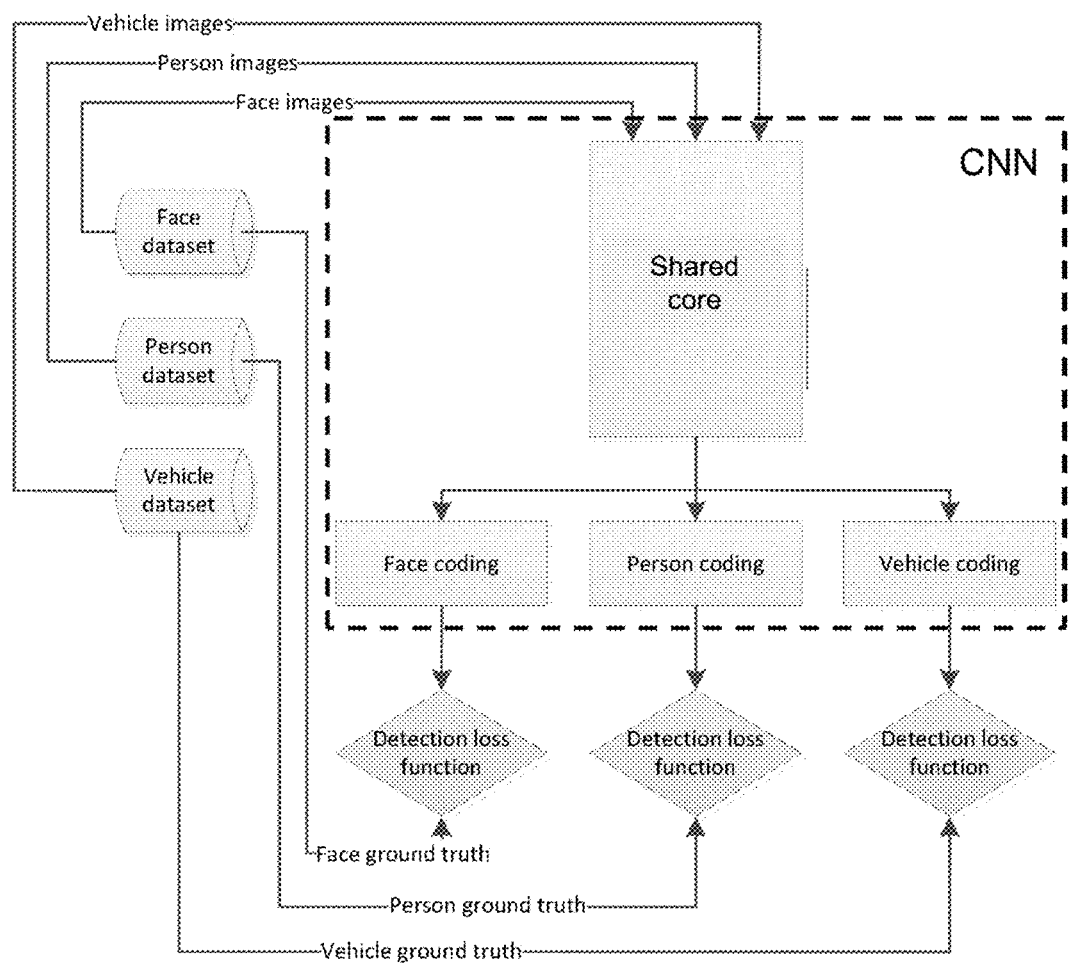
FIG. 6 schematically shows the training of a CNN for a preferred embodiment of the method according to the invention.

Referring to FIG. 6, said plurality of training image databases advantageously comprises at least one first training image database (wherein at least the items of interest from the first category are already annotated) and a second database (wherein at least the items of interest from the second category are already annotated; there could even be a third database.

In particular, the set of categories of item of interest associated with the first database comprises the person category (the first category in the examples), the set of categories of item of interest associated with the second database comprises the face category (the second category), and the set of categories of item of interest associated with the potential third database comprises one or more categories of inanimate objects, like the vehicle category or at least one vehicle subcategory (for example, the seven categories: car, truck, bus, two wheeler, bicycle, plane and boat). However, it is understood that the choice of databases/categories is not limited.

For that, a CNN having a shared core and a plurality of encoding layers each specific to one of said plurality of training image databases is used as common CNN.

In other words, as is seen in FIG. 6, the CNN architecture doesn't have one encoding layer shared by the set of modalities (meaning the various sets of categories), but one encoding layer specific to some of the modalities.

Particularly preferably, said shared core comprises all the layers having variable parameters other than the encoding layer, and in particular beginning the beginning. In the example from FIG. 5, the shared core extends down to the double horizontal line.

In other words, assuming that there are three training image databases as in the example from FIG. 6, then there are three encoding layers and for each training image taken as input, the encoding layer corresponding to the database from which the training image comes is used.

It is therefore understood that all the training images participate in the training of the shared core, but that only the images from one database participate in the training of each encoding layer.

The various encoding layers are, as explained, each advantageously composed of a convolution layer with filters preferably of size 1×1, and whose output size C (the number of filters) corresponds to the size of the representation vector (typically 8 for people and faces and 14 for vehicles if there are seven subcategories as in the example above, plus said descriptive values from at least one geometric structure characteristic for at least one of them). The various encoding layers are typically arranged in parallel.

Additionally, advantageously, as shown in FIG. 6, a plurality of cost functions are used again, each specific for one of said plurality of training image databases.

It will be recalled that the cost function (referred to as a "loss") indicates how training the CNN penalizes the gap between the expected and real signal. More precisely, for input data (training image), the cost function serves to quantify an "error" between the output obtained by the CNN (the detected items) and the theoretical output (the annotated items). Training aims to change the parameters of the CNN so as to gradually reduce the error as calculated by the cost function. The Soft max function (or standardized exponential function), or even the Huber function, are known from standards like the L1 standard, etc.

To do the training strictly speaking, the conventional technique, called backpropagation of the gradient, propagates the calculated error backwards so as to update the parameters of all the layers.

In the present embodiment, different cost functions according to the database from which each training image comes are used to do this. More precisely, training images are drawn randomly and iteratively from the plurality of databases (i.e. each image can come from any database), and for each of them the weights and parameter of the CNN are varied on the basis of the cost function corresponding to the database from which it comes.

In a particularly preferred way, a training paradigm called "batch" is implemented, meaning that for a set of training images coming arbitrarily from various databases, the errors (with the corresponding cost function) are first calculated without updating the parameters, then these various errors are added and when the set of images from said set is past once into the CNN, backpropagation is applied in the entire CNN by using the total error (summed).

The shared CNN can be used as "multi-category" detector when applied to the images from the video. Naturally, it is already possible to make multicategory detectors from a single database if it already has items from several annotated categories, but one is limited to these categories. The shared CNN of the present embodiment serves to combine any training databases and therefore be multicategory completely freely.

It is understood that multiplying the encoding layers and the cost functions serves, without substantially increasing the size of the network, to not have one detection penalized by another and have the same efficiency as with a plurality of detectors. Further, there is a significant time savings in the training because it can be done simultaneously for all databases.

It should be noted that it remains entirely possible, if one wants to detect a large number of different categories, to train other CNNs whether they are each common to several databases or specific to one database. For example one could have a first common CNN detector for multiple categories and a second CNN detector dedicated to another complex category to be identified, trained therefore on a specific database.

Alternatively or additionally, the training of the one or more CNNs can be implemented from at least one training image database wherein characteristic geometric structures are already annotated, in particular the characteristic geometric structures of at least one data category (the first category).

As explained earlier, the CNN then comprises an encoding layer for the generation of a representation vector for items of interest to be detected comprising for at least said first category of item of interest to be detected, at least one (advantageously three, in particular coordinates and visibility) descriptive value of at least one (advantageously three) characteristic geometric structures (in particular characteristic point) of said first category of item of interest. It will again be understood that not all the characteristic geometric structures will necessarily be visible and that naturally only those which are visible can be detected. Thus, even if one attempts to detect three characteristic points, it will not necessarily be possible to succeed for all three (but the one or more which are not visible will then be indicated).

Detection and Association

The present invention relates in particular to a method for association of items of interest visible in a video made up of a sequence of K images, implemented by the data processing means 21 of the terminal 2, for tracking.

Referring to FIG. 3, the present method of association starts with a step (a) of association of each item of interest from a first category visible in a $k^{th}$ image of said video (frame) with an item of interest from a second category, different from the first category, visible in the $k^{th}$ image. The idea is to understand that it involves a "pre-association" which is based solely on the $k^{th}$ image taken in isolation (without considering the remainder of the video), which can therefore be false, and which is therefore going to be evaluated and corrected as necessary.

It is recalled that the two associated items are considered as being linked to, and in particular being part of, the same entity, as previously explained.

It will be noted that it is still possible that there remains an "orphan" item of the first or the second category if there aren't the same number of items from the first and second category detected, i.e. if for example the one with which one item should have been associated is masked or that the detection did not work. For example, in FIG. 1a, the baby is not detected (only its face is) and there is therefore an orphan face.

Each item of interest is advantageously referenced with an identifier and preferably the association of two items results in association of the first to the second identifier (i.e. both references are under the same identifier).

It is known to do the tracking based on the associations, but as explained the tracking can be falsified if a bad association occurs. Thus, the present method implements a frame by frame correction for the associations. Indeed, while an association for one image taken in isolation could be optimal, it may be inconsistent with preceding images. More precisely, an association obtained with step (a) is assumed, and that association is going to be studied.

Preferably, the method is repeated iteratively for each image $k \in [[1;K]]$ in the video so as to implement the association continuously and then the tracking, even if it is understood that it can only be implemented from time to time for correcting the associations. In the present description, the example of sequencing images k and k+1 will be taken but it could be naturally transposed to any pair of successive images.

Preferably, the step (a) comprises the detection of at least one item of interest from a first category visible in said $k^{th}$ image and at least one item of interest from a second category visible in said $k^{th}$ image.

The person skilled in the art can use any known technique for implementing this detection, and in particular a CNN as explained, preferably trained using a training method such as previously described.

According to a first embodiment, a CNN adapted for each category is used. In other words, each image is processed as many times as there are expected categories so as to detect all the items of interest from all the categories.

According to a second embodiment, at least one "multi-type" shared CNN is used for all or part of the categories to be detected.

Next, each item of interest from the first category detected in said $k^{th}$ image is associated with an item of interest for the second category detected in said $k^{th}$ image. The association can be implemented conventionally (typically by detection of inclusion of a second item in the first item), but particularly preferably an innovative method of association of items of interest in an image is used, involving the CNN with lengthened representation vector described above.

In this embodiment, at least one item of interest from a first category is detected, at least one item of interest from a second category different from the first, and then, for each item of interest from the first category detected, the one or more characteristic geometric structures of said first category of item of interest (i.e. the one or more characteristic geometric structures associated with each item from the first category) visible in said image are detected.

Those are chosen such that the second category is a subpart of the first category, and the characteristic geometric structures of the first category of item of interest are also characteristic geometric structures of the second category of item of interest. As already explained, this is, for example, the case of points from the face such as the nose and eyes.

Then, following the detection, for each pair of a detected first item of interest from the first category and a detected second item of interest from the second category, a covering score between a box of said second item and the one or more characteristic geometric structures of said first category of interest for the first item is preferably calculated.

The clever idea is not to directly compare the items from the first category and the items from the second category, but starting from the principle that the second category is a subpart of the first category and that the characteristic geometric structures of the first category of item of interest are also characteristic geometric structures of the second category of item of interest, to directly compare the characteristic geometric structures of the first category with the items from the second category: the characteristic geometric structures can be seen as a "second detection" of an item from the second category, which is easy to align therewith.

"Covering score" is understood to mean any metric representative of the correspondence between one box and characteristic geometric structures, i.e. increasing when the characteristic geometric structures are more and more included in the box.

According to a first embodiment, the covering score of a pair of a first item with the second item can simply be equal to the number of characteristic geometric structures for the first item which are also included in the box for the second item (which could be normalized by dividing by the total number of characteristic geometric structures). For example, in the example from FIG. 1b, a covering score with each of the faces of the mother and child is ⅓ because each of the corresponding boxes includes one point characteristic of the mother (in this case the nose or the left eye, since the right eye is not visible).

According to a second embodiment, in particular if three characteristic geometric structures, and in particular characteristic points, are detected, the score is a covering rate between said box of the second item and a convex envelope of the characteristic geometric structures of said first category of item of interest for the first item, meaning a ratio based on the corresponding surface areas. In FIG. 6b said complex envelope of three points characteristic of said first category of item of interest for the first item can be seen in a sample image.

The Jaccard criteria—meaning the ratio between the intersection (of the box and the convex envelope) and the union (of the box and the convex envelope), also called "Intersection over Union" (IOU) can be used very advantageously.

For example, by writing $KP_{icvx}$ for the convex envelope of the characteristic geometric structures for the $i^{th}$ item of interest from the first category and $F_j$ for the $j^{th}$ item of interest from the second category, then the covering score is given by the formula $$scIOU_{ij} = \frac{F_j \cap KP_{icvx}}{F_j \cup KP_{icvx}}.$$

Finally, a combinatorial optimization algorithm can be implemented depending on the calculated covering scores so as to associate each detected item of interest from the first category with the detected item of interest from the second category.

Combinatorial optimization algorithm (also called discrete optimization) is understood to mean an algorithm capable of finding an overall solution to the association problem, i.e. of finding the optimal combination of pairs among all the possible combinations of pairs, where optimal is understood in terms of "total cost": this could for example be based on a cost for example $1-scIOU_{ij}$ (and in general any decreasing function: the higher the covering score is, the lower the association cost is).

Many combinatorial optimization algorithms are known, and preferably the Hungarian algorithm is used which is particularly suited to the case at hand (alternatively, the Ford-Fulkerson algorithm can for example be indicated).

It should be noted that a "naive" optimization algorithm can always be used wherein it is limited to associating with each item from the first category the item from the second category with which the covering score is maximal, even though very close boxes (typical case for faces) and also imprecisions in the detection of characteristic geometric structures can lead to association errors.

Association Cost

In a step (b), the data processing means 21 calculate an "association cost" for each pair of an item of interest from the first category detected in at least one image with an item of interest from the second category detected in at least one image, depending on at least association counters for each pair of one item of interest from the first category with one item of interest from the second category.

It should be noted that while the step (b) is typically implemented only for the items of interest detected (already associated) in the current $k^{th}$ image, it can very advantageously also include the potential items detected in the preceding image (the $k-1^{th}$) but "disappeared" (not visible), or even all the items of interest having at least one non-zero value association counter (with one of the items detected in the current $k^{th}$ image), see later.

Preferably, an intermediate position is taken by expecting that an association cost is calculated for each pair of an item from a category detected in the $k^{th}$ image with an item of interest from another category having a non-zero association counter with said item, i.e. an association cost is calculated for each pair of an item from the first category detected in the $k^{th}$ image with an item of interest from the second category already detected in at least one image from the video such that the association counter for said pair is not zero, and for each pair of an item from the second category detected in the $k^{th}$ image with an item of interest from the first category already detected in at least one image of the video such that the association counter for said pair is not zero.

An association counter for a pair of items of interest from two different categories is understood to mean a natural integer representing in particular the number of times that the two items from this pair were previously associated. The association counter for one pair is typically incremented for each image wherein the association is obtained, and in the opposite case maintained or even advantageously decremented (since the counter is always at least equal to 0). A provisional update of the counters can take place after the association from step (a).

It is understood that there can be as many counters as possible pairs. In the example where there are four items of interest from the first category referenced $P_{i, i \in [\![1;4]\!]}$ (person category), and three items of interest from the second category referenced $F_{j, j \in [\![1;3]\!]}$ (face category), there can be up to 12 association counters denoted $ac_{ij,\{i,j\} \in [\![1;4]\!] \times [\![1;3]\!]}$. It should be noted that preferably, in so far as the large majority of combinations will never exist, only the counters for an association having occurred at least once in the video are kept.

In a case where there are more than two categories of item of interest which can be associated (for example, person, face and hand), a set of association counters per entity is used (in the example, person/hand counters and person/face counters).

The association cost can be understood as the application of a cost function to the association counters. It is representative of a "cost" necessary for making one association among all the associations, i.e. the difficulty thereof, and serves to express the counter for one pair compared to all the counters. Thus, the lower the association cost for a given pair is, the more likely this association is of being the good one.

The person skilled in the art can use any known cost function. According to a first embodiment, the association cost is a function of only the association counters.

By denoting $C_{ij}$ the association cost of the $i^{th}$ item of interest from the first category with the $j^{th}$ item of interest from the second category ($F_i$-$P_j$), with n the number of items from the first category and m the number of items of interest from the second category, the following formulas can for example be used:

$$C_{ij} = 1 - \frac{2 * ac_{ij}}{\sum_{l=0}^{n} ac_{il} + \sum_{l=0}^{m} ac_{lj}}$$

$$C_{ij} = \sum_{l \neq j}^{n} ac_{il} + \sum_{l \neq i}^{m} ac_{lj}$$

These formulas show some "inertia" from past associations. More specifically, it can be seen that the cost for maintaining a pair is always less than the cost for creating a new pair. The association counters act as a history and the use of cost functions thus serves to enhance the stability.

According to a second embodiment, the association counters are weighted by detection scores ($sd_{i/j}$ indicates respectively the detection scores for the $i^{th}$ item from the first category and the $j^{th}$ item from the second category), i.e. the association cost is a function (only) of the association counters and detection scores. The following formulas can for example be used:

$$C_{ij} = 1 - \frac{2 * ac_{ij} * sd_i * sd_j}{\sum_{l=0}^{n} sd_l ac_{il} + \sum_{l=0}^{m} sd_j ac_{lj}}$$

$$C_{ij} = \sum_{l \neq j}^{n} sd_i ac_{il} + \sum_{l \neq i}^{m} sd_j ac_{lj}$$

Again, alternatively the covering scores as previously presented can be used with, for example, the following formulas:

$$C_{ij} = 1 - \frac{2 * ac_{ij} * scIOU_{ij}}{\sum_{l=0}^{n} scIOU_{il} ac_{il} + \sum_{l=0}^{m} scIOU_{lj} ac_{lj}}$$

$$C_{ij} = \sum_{l \neq j}^{n} scIOU_{il} ac_{il} + \sum_{l \neq i}^{m} scIOU_{lj} ac_{lj}$$

The weighting by scores serves to limit the effect of inertia and still favor the creation of a new pair in case of particularly high scores.

Combinatorial Optimization and Update

In a step (c), the data processing means 21 implement a combinatorial optimization algorithm depending on the calculated association costs so as to reassociate each item of interest from the first category detected in said $k^{th}$ image with an item of interest from the second category detected in said $k^{th}$ image. It involves "verification" of the initial association from the step (a) and it is entirely possible that the step (c) only confirms it.

The same optimization algorithm may be used here as those previously described for the preferred embodiment of the association from step (a), but not necessarily.

Preferably the Hungarian algorithm which is particularly suited to the case at hand is used again (alternatively, the Ford-Fulkerson algorithm can for example be indicated).

Preferably, the step (c) further comprises the reassignment of identifiers to the items of interest detected in said $k^{th}$ image. Indeed, if again the step (c) is typically implemented only for the items of interest detected (already associated) in the current $k^{th}$ image, at least the combinatorial optimization algorithm can very advantageously also include the possible items detected in the preceding image (the $k-1^{th}$) but "disappeared" (not visible), possibly even all the items of interest having at least one non-zero value association counter (with one of the items detected in the current $k^{th}$ image), and generally all the items of interest involved in a pair for which an association cost was calculated in step (b).

Indeed, while naturally only visible items can be associated, it is possible that at the end of the step (c), the combinatorial optimization algorithm aligns a visible item with another still "more visible". This situation indicates that one of the visible items of interest (in this case the one associated at the end of step (a) is a duplicate with the other item of interest that is not visible). Later we will look at an example of such a case and how it works.

In a final step (d), the association counters are updated according to the result of the associations. This may allow for a possible provisional update following the step (a). As explained, it involves natural integers, such that said update is by incrementing and/or decrementing (of course the value of some counters can remain the same as well). In other words, each counter can be incremented, kept unchanged, or decremented, i.e. the value of the counter varies by an integer step (value after update equal to value before update plus a relative integer which can be zero or negative).

In this update, at least the association counters of pairs obtained (created or kept) are incremented, and advantageously those (still non-zero) of pairs not obtained (in particular abandoned) are decremented so as to amplify the effect. As explained before, the counters do not go negative, and therefore all "zero" counters are ignored.

Association Correction

A case of "bad association" can occur if, for example, the face of one person is poorly placed in the $k^{th}$ image, such that the face of another person is associated with it in error (see FIG. 4a). With the present method, this error can be corrected.

More specifically, if the step (a) comprises the detection in the $k^{th}$ image of at least one first item of interest, a second item of interest and a third item of interest, where the first item of interest is from the first category and the second and third items of interest are from the second category, and if the first item of interest is associated with the second item of interest, the step (c) comprises, depending on the result of using some combinatorial optimization algorithm:

Either keeping the association of the first item of interest with the second item (the association is confirmed in the case of the pair $P_1$-$F_1$ in FIG. 4a), the association counter of the first item of interest with the second item of interest then being incremented (and the association counter of the first item of interest with the third item of interest being decremented) in the step (d);

Or the reassociation of the first item of interest with the third item of interest in place of the second item of interest (detection of a bad association and correction, typically what happens if the association counter of the first item with the third item is higher than the association counter of the first item with the second item, case of the pair $P_2$-$F_2$ in FIG. 4a) the association counter of the first item of interest with the third item of interest then being incremented (the association counter of the first item of interest with the second item of interest being decremented) in the step (d).

Merging Tracks

A case of "track duplication" can occur if the same entity is detected successively as two distinct items of interest, i.e. referenced by two different identifiers (a track was created unnecessarily), which is often a consequence of a bad association (the "unassociated" item of interest starts a new track). The present method makes it possible to merge these two items by forcing an association with the "original" item, which will lead to the progressive disappearance of the duplicate. It is understood that in practice the assignment is not changed, but only the identifier of the duplicate.

This is made possible by the fact of considering in the optimization algorithm from the step (c) some undetected items but having an association counter with a detected item which is non-zero (i.e. they have recently been associated with the visible item, but do not appear, which is suspect).

Thus, if the step (a) comprises the detection in the $k^{th}$ image of at least one first item of interest and one second item of interest but not that of a third item of interest, where the first item of interest is from the first category and the second item of interest and third item of interest are from the second category, and if the first item of interest is associated with the second item of interest, the step (c) comprises, depending on the result of using said combinatorial optimization algorithm:

Either the "normal" keeping of the association of the first item of interest with the second item (the association is confirmed, meaning that the former association of the first item with the third item was an error), the association counter of the first item of interest with the second item of interest then being incremented (the association counter of the first item of interest with the third item of interest then being decremented) in the step (d);

Or the reassignment of the identifier from the third item of interest to the second item of interest (it is understood that the association of the first item with the second item was not wrong, but that the second item was one and the same with the third item and therefore the track thereof is recovered, typically what happens if the association counter of the first item with the third item is higher than the association counter of the first item with the second item, case of the pair $P_4/P_1$-$F_1$ in FIG. 4a) the association counter of the first item of interest with the third item of interest then being incremented (the association counter of the second item can be decremented, or even directly set to zero to eliminate this track) in the step (d).

Computer Program Product

According to a second and third aspects, the invention relates to a computer program product comprising code instructions for execution (in particular on the data processing means 11a, 11b, 11c, 21 of one or more servers 1a, 1b, 1c or the terminal 2) of a method according to the first aspect of the invention for association of items of interest visible in a video; as well as storage means readable by computer equipment (memory 12a, 12b, 12c, 22 of one or more servers 1a, 1b, 1c or of the terminal 2) on which this computer program product is located.

The invention claimed is:

1. A method for association of items of interest visible in a video consisting of a sequence of K images, characterized in that it comprises the implementation, by data processing means (21) of a terminal (2), for a $k^{th}$ image of said video, of steps of:
   (a) Detection of at least one item of interest from a first category visible in said $k^{th}$ image and of at least one item of interest from a second category different from the first category visible in said $k^{th}$ image of said video, and association of each item of interest from the first category detected in said $k^{th}$ image with one of said at least one item of interest from the second category detected in said $k^{th}$ image;
   (b) Calculation of an association cost for a plurality of pairs of an item of interest from the first category visible in at least one image from the video with an item of interest from the second category visible in at least one image of the video, depending on at least association counters of pairs of one item of interest from the first category with one item of interest from the second category;
   (c) Use of a combinatorial optimization algorithm depending on the calculated association costs so as to reassociate each item of interest from the first category visible in said $k^{th}$ image with an item of interest from the second category visible in said $k^{th}$ image;
   (d) Update of the association counters by incrementing and/or decrementing,
   wherein an association is calculated in the step (b) for each pair of an item of an interest from the first category detected in the $k^{th}$ image with an item of interest from the second category already detected in at least one image from the video such that the association counter for said pair is not zero, and for each pair of an item of interest from the second category detected in the $k^{th}$ image with an item of interest from the first category already detected in at least one image of the video such that the association counter for said pair is not zero.

2. The method according to claim 1 repeated iteratively for each image $k \in [[1;K]]$ in the video.

3. The method according to claim 1 wherein two associated items of interest are considered as being up part of the same entity.

4. The method according to claim 3, wherein one from the first and from the second category of item of interest is a subpart of the other.

5. The method according to claim 4, wherein either one from the first and from the second category is a face category and the other is a person category, or else one from the first and from the second category is a license plate category and the other is a vehicle category or a subcategory of the vehicle category.

6. The method according to claim 1 wherein said combinatorial optimization algorithm is the Hungarian algorithm.

7. The method according to claim 1 wherein the detection of the step (a) is implemented by means of at least one convolutional neural network, CNN.

8. The method according to claim 1 wherein each item of interest is referenced with an identifier, two associated items of interest being referenced with the same identifier.

9. The method according to claim 8, wherein if the step (a) comprises the detection in the $k^{th}$ image of at least one first item of interest and one second item of interest but not that of a third item of interest, where the first item of interest is from the first category and the third item of interest is from the second category, and if the first item of interest is associated with the second item of interest, the step (c) comprises depending on the result of using said combinatorial optimization algorithm:
   Either keeping the association of the first item of interest with the second item, the association counter of the first item of interest with the second item of interest then being incremented in the step (d);
   Or the reassignment of the identifier of the third item of interest to the second item of interest, the association counter of the first item of interest with the third item of interest then being incremented in the step (d).

10. The method according to claim 9, wherein an association counter not incremented is decremented in the step (d).

11. The method according to claim 1, wherein if the step (a) comprises the detection in the $k^{th}$ image of at least one first item of interest, one second item of interest and a third item of interest, where the first item of interest is from the first category and the second and third items of interest are from the second category, and if the first item of interest is associated with the second item of interest, the step (c) comprises depending on the result of using said combinatorial optimization algorithm:
   Either keeping the association of the first item of interest with the second item, the association counter of the first item of interest with the second item of interest then being incremented in the step (d);
   Or the reassociation of the first item of interest with the third item of interest in place of the second item of interest, the association counter of the first item of interest with the third item of interest then being incremented in the step (d).

12. The method according to claim 1, wherein the cost of association of the $i^{th}$ item of interest from the first category visible in said $k^{th}$ image with the $j^{th}$ item of interest from the second category visible in said $k^{th}$ image is obtained in step (b) by one of the following formulas:

$$C_{ij} = 1 - \frac{2*ac_{ij}}{\sum_{l=0}^{n} ac_{il} + \sum_{l=0}^{m} ac_{lj}},$$

$$C_{ij} = \sum_{l \neq j}^{n} ac_{il} + \sum_{l \neq i}^{m} ac_{lj},$$

$$C_{ij} = 1 - \frac{2*ac_{ij}*sd_i*sd_j}{\sum_{l=0}^{n} sd_l ac_{il} + \sum_{l=0}^{m} sd_l ac_{lj}} \text{ or}$$

$$C_{ij} = \sum_{l \neq j}^{n} sd_l ac_{il} + \sum_{l \neq i}^{m} sd_l ac_{lj}$$

where n is the number of items of interest from the first category and m is the number of items of interest from the second category visible in said $k^{th}$ image and $sd_{i/j}$ are respectively the detection scores of said $i^{th}$ item of interest from the first category and said $j^{th}$ item of interest from the second category.

13. A non-transitory computer-readable program product comprising code instructions for the execution of a method according to claim 1 for association of items of interest visible in a video, when said code instructions executed by a computer.

14. A non-transitory storage means readable by a computer equipment on which are stored computer program code instructions for the execution of a method according to claim 1 for association of items of interest visible in a video.

* * * * *